United States Patent
Pham et al.

(10) Patent No.: US 11,023,304 B2
(45) Date of Patent: *Jun. 1, 2021

(54) SYSTEM AND METHOD FOR DATA ERROR NOTIFICATION IN INTERCONNECTED DATA PRODUCTION SYSTEMS

(71) Applicant: Capital One Services, LLC, McLean, VA (US)

(72) Inventors: Vincent Pham, Champaign, IL (US); Reza Farivar, Champaign, IL (US); Kate Key, Effingham, IL (US); Jeremy Goodsitt, Champaign, IL (US); Mark Watson, Sedona, AZ (US); Fardin Abdi Taghi Abad, Seattle, WA (US); Anh Truong, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,721

(22) Filed: Feb. 24, 2020

(65) Prior Publication Data

US 2021/0124637 A1    Apr. 29, 2021

Related U.S. Application Data

(63) Continuation of application No. 16/665,171, filed on Oct. 28, 2019, now Pat. No. 10,613,919.

(51) Int. Cl.
*G06F 11/00* (2006.01)
*G06F 11/07* (2006.01)
(Continued)

(52) U.S. Cl.
CPC ........ *G06F 11/0784* (2013.01); *G06F 11/079* (2013.01); *G06F 11/0772* (2013.01);
(Continued)

(58) Field of Classification Search
CPC ............. G06F 11/0784; G06F 11/0772; G06F 11/0775; G06F 11/079; G06F 11/3006; G06F 11/3065; G06F 11/326
See application file for complete search history.

(56) References Cited

U.S. PATENT DOCUMENTS

| | | | | |
|---|---|---|---|---|
| 5,127,006 A | * | 6/1992 | Subramanian | ...... G06F 11/2273 714/35 |
| 5,812,758 A | * | 9/1998 | Laureanno | .......... G06F 11/2257 714/25 |

(Continued)

*Primary Examiner* — Jonathan D Gibson
(74) *Attorney, Agent, or Firm* — Hunton Andrews Kurth LLP

(57) ABSTRACT

An error notification system includes a plurality of data production systems in communication with a monitoring server. Each data production system has a data processor configured to receive input data from a first set of data production systems, process the input data to produce output data, and make the output data accessible to a second set of data production systems. The monitoring server is configured to monitor data transmissions between the data production systems and to identify, for each data transmission, originating and receiving systems. The monitoring server is further configured to map data flow from each originating source system to identify all downstream data production systems. Upon identification of a data error in the originating source system, the monitoring server obtains data error information, assembles a data error notification, and transmits the data error notification to data production systems meeting system notification criteria.

20 Claims, 3 Drawing Sheets

(51) Int. Cl.
*G06F 11/32* (2006.01)
*G06F 11/30* (2006.01)

(52) U.S. Cl.
CPC ...... *G06F 11/0775* (2013.01); *G06F 11/3006* (2013.01); *G06F 11/3065* (2013.01); *G06F 11/326* (2013.01)

(56) References Cited

U.S. PATENT DOCUMENTS

| | | | |
|---|---|---|---|
| 5,987,629 A | 11/1999 | Sastry et al. | |
| 6,263,361 B1 | 7/2001 | Hoyer et al. | |
| 6,442,694 B1 * | 8/2002 | Bergman | H04L 41/0654 |
| | | | 709/224 |
| 6,836,798 B1 | 12/2004 | Adams | |
| 6,990,609 B2 | 1/2006 | Wiley et al. | |
| 7,058,704 B1 | 6/2006 | Mangipudi et al. | |
| 7,478,404 B1 | 1/2009 | Campbell | |
| 7,529,828 B2 | 5/2009 | Seki et al. | |
| 7,660,702 B2 | 2/2010 | Blight et al. | |
| 7,827,132 B2 | 11/2010 | Grabarnik et al. | |
| 7,865,574 B1 | 1/2011 | Laura et al. | |
| 7,873,594 B2 | 1/2011 | Harada et al. | |
| 7,925,931 B1 * | 4/2011 | Smith | G06F 11/0793 |
| | | | 714/43 |
| 8,429,458 B2 | 4/2013 | Yokoyama | |
| 8,762,533 B2 | 6/2014 | Sarmah | |
| 8,880,487 B1 | 11/2014 | Clinton et al. | |
| 8,966,016 B2 | 2/2015 | Kaminsky | |
| 10,613,919 B1 * | 4/2020 | Pham | G06F 11/0781 |
| 2002/0013748 A1 | 1/2002 | Edmison et al. | |
| 2002/0138571 A1 | 9/2002 | Trinon et al. | |
| 2002/0165842 A1 | 11/2002 | Hellerstein et al. | |
| 2002/0194524 A1 | 12/2002 | Wiley et al. | |
| 2003/0051030 A1 | 3/2003 | Clarke et al. | |
| 2003/0101385 A1 * | 5/2003 | Lee | G06F 11/327 |
| | | | 714/48 |
| 2006/0224375 A1 | 10/2006 | Barnett et al. | |
| 2007/0245357 A1 | 10/2007 | Breiter et al. | |
| 2009/0037481 A1 | 2/2009 | Baker | |
| 2009/0248803 A1 | 10/2009 | Akaboshi et al. | |
| 2011/0185220 A1 * | 7/2011 | Foley | G06F 11/0784 |
| | | | 714/2 |
| 2011/0239191 A1 | 9/2011 | Ramachandran | |
| 2011/0258215 A1 | 10/2011 | Naik et al. | |
| 2012/0005243 A1 | 1/2012 | Van der Merwe et al. | |
| 2013/0127863 A1 | 5/2013 | Witt et al. | |
| 2014/0344633 A1 * | 11/2014 | Li | G06F 11/0784 |
| | | | 714/57 |
| 2016/0259677 A1 | 9/2016 | Della Corte et al. | |
| 2016/0283304 A1 | 9/2016 | Horikawa et al. | |
| 2017/0010932 A1 | 1/2017 | Inamura et al. | |
| 2019/0129785 A1 | 5/2019 | Liu et al. | |
| 2019/0146861 A1 * | 5/2019 | Joshi | H04L 41/0672 |
| | | | 714/37 |
| 2020/0167221 A1 * | 5/2020 | Vembu | G06F 11/0769 |

* cited by examiner

SYSTEM AND METHOD FOR DATA ERROR NOTIFICATION IN INTERCONNECTED DATA PRODUCTION SYSTEMS

CROSS REFERENCE TO RELATED APPLICATION

This application is a continuation of U.S. patent application Ser. No. 16/665,171 filed Feb. 24, 2020, now U.S. Pat. No. 10,613,919, the complete disclosure of which is incorporated herein by reference in its entirety.

FIELD OF THE INVENTION

This disclosure relates generally to data flow within interconnected data production systems and, more specifically, to identification and communication of data usage risk in such systems.

BACKGROUND OF THE INVENTION

Large organizations often make use of multiple big data systems that synthesize and process data and then distribute that data to one another. Often, when a problem occurs with a particular set of data, it may be propagated throughout the organization before the error is identified and/or before its existence can be communicated to system users. This can affect, not only the use of the data itself, but the use of derivative data as well. Even if the users of the originating data production system become aware of the problem, they may not know who to notify because they do not know which downstream systems have accessed the data.

SUMMARY OF THE INVENTION

An illustrative aspect of the invention provides a data production error notification system comprising a plurality of data production systems and a monitoring server in communication with each of the plurality of data production systems. Each data production system has a data processor configured to receive input data from a first set of one or more of the plurality of data production systems, process the received input data to produce output data, and make the output data accessible to a second set of one or more of the plurality of data production systems. The data processor is further configured to, responsive to identification of a data error in the production of the output data, generate data error information. The monitoring server is configured to monitor data transmissions between the data production systems and to identify, for each data transmission, an originating source system for the data transmitted and a receiving system. The monitoring server is further configured to map data flow from each originating source system to identify all downstream data production systems receiving transmitted data from that originating source system or data derived from such transmitted data. The monitoring server is also configured to, upon identification of a data error in the originating source system, obtain data error information from the originating source system and assemble a data error notification. The data error notification includes an identification of the originating source system and the data error information. The monitoring server is further configured to transmit the data error notification to those of the plurality of data production systems that meet system notification criteria.

Another aspect of the invention provides a method of mitigating error propagation risk in a plurality of interconnected data production systems. The method comprises monitoring, by a monitoring server in communication with the plurality of data production systems, a plurality of data transmissions between the data production systems. Each data transmission is from a transmitting system to a receiving system. The method further comprises identifying, by the monitoring server, for each data transmission, an originating source system for the data transmitted, and mapping, by the monitoring server, data flow from each originating source system to identify all downstream data production systems that have received transmitted data from that originating source system. The method still further comprises receiving, by the monitoring server, an error message indicating that a data error has occurred in a previously identified originating source system. The error message includes data error information. The method also comprises assembling, by the monitoring server, a data error notification including an identification of the originating source system and the data error information, and transmitting, by the monitoring server, the data error notification to those of the plurality of data production systems that meet system notification criteria.

Another aspect of the invention provides a data production monitoring server comprising a communication interface, a transmission monitoring processor, a mapping processor, and a notification processor. The communication interface is in communication with each of a plurality of data production systems and is configured for receiving data transmission information for each data transmission between data production systems. The transmission monitoring processor is configured to determine, for each data transmission, a transmitting system, a receiving system, and an originating source system for the data transmitted. The mapping processor is configured to identify, for each originating source system, all data production systems that have received transmitted data generated by that originating source system. The notification processor is configured to, upon identification of a data error in the originating source system, obtain data error information from the originating source system, assemble a data error notification including an identification of the originating source system and the data error information, and transmit, via the communication interface, the data error notification to data production systems that meet system notification criteria.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and production environments, it will be understood that the invention is not limited to these embodiments and environments. On the contrary, it is contemplated that various alternatives, modifications and equivalents are included within the spirit and scope of the invention as described.

The present invention provides methods and systems for identifying risk associated with the propagation of errant data within a system of interconnected data production systems. The methods of the system involve monitoring and mapping data flow within the overall system so that when a data error is identified on an originating data production system, a risk notification message can be constructed and transmitted to the particular downstream systems that have received or otherwise accessed the errant data. Such a message may be created by a data traffic monitoring system that can evaluate the potential impact of the data error and condition the transmission of the message on the error meeting predetermined criteria.

Figure 1:
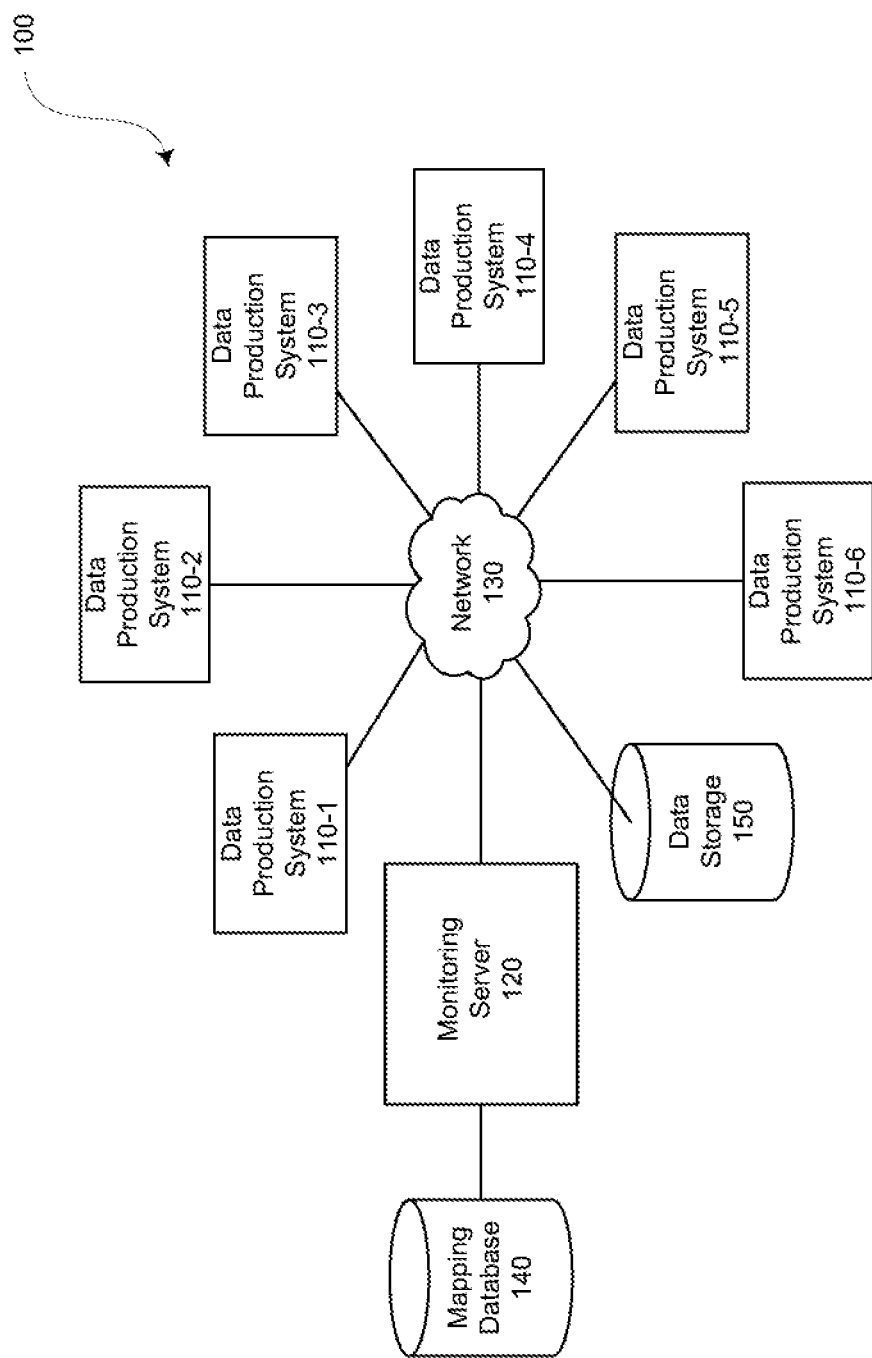
FIG. 1 is invention schematic representation of an organization level system of data production systems according to an embodiment of the invention.

FIG. 1 depicts a representative organization-level system 100 in which methods according to various embodiments of the invention may be implemented. The organization level system 100 may include various network-enabled computer systems, including, a plurality of data production systems 110 (numbered 110-1 to 110-6) a monitoring server 120, and one or more data storage units 150. The data production systems 110 are interconnected with one another and the monitoring server 120 via a communication network 130.

As used herein, the term "data production system" means any data processing system or software component that operates under control policies of the organization managing the system 100 and that receives data from other organization systems, processes the data to produce output data, and makes the output data available to other organization systems.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). The network-enabled computer systems used to carry out the methods of the invention may execute one or more software applications to, for example, receive data as input from an entity accessing the network-enabled computer system, process received data, and transmit or receive data over the network 130 and/or other networks. The one or more network-enabled computer systems may also include one or more software applications that conduct operations to originate data based on information from other sources and/or make use of data received from other systems within the organization level system. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. In other cases, components identified as separate systems may actually be virtual systems running on the same hardware system. The organization level system 100 may also include other devices not depicted in FIG. 1.

The network 130 may be any form of communication network capable of enabling communication between the data production systems 130. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

Figure 2:
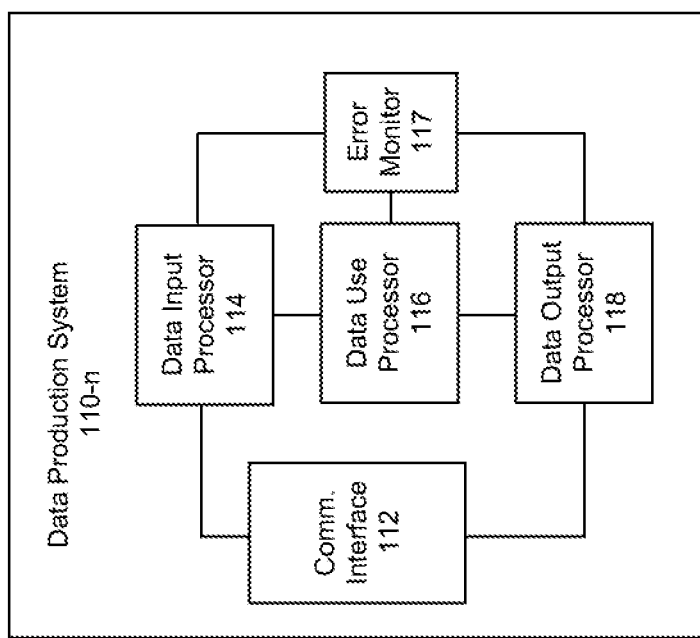
FIG. 2 is a schematic representation of a data production system that may be used in embodiments of the invention.

Each data production system 110 may be, be part of, or be resident on a network-enabled computer system configured for receiving data from and distributing data to other data production systems 100 within the organization level system 100. With reference to FIG. 2, a typical data production system 110-$n$ may include a communication interface 112, a data input processor 114, a data use processor 116, and a data output processor 118.

The communication interface 112 is configured to establish and support wired or wireless data communication capability for connecting the data production system 110 to the network 130 or other communication network. The data input processor 114 may be configured to receive input data transmitted directly from certain other data production systems 110 or to retrieve data produced by other data production systems 110 and made available through storage in a data storage unit 150. The data input processor 114 may be configured to transmit a notification to the monitoring server 120 noting the receipt of input data form a particular source production system 110. The data input processor 114 may be configured to review and preprocess the input data to place it in usable format for processing by the data use processor 116. The data input processor 114 may be or include, in particular, a parser configured to read and identify fields of information in input data sets. In some embodiments, the data input processor 114 may be provided with data input field information or other information on expected input data format, which the data input processor 114 may use to preprocess the input data. In some embodiments, the data input processor 114 may also be configured to receive user input data and/or data from sources external to the organization level system 100 (e.g., via an external network connection).

The data use processor 116 may be configured to receive preprocessed input data and conduct data production operations using any of various software components resident thereon. Such operations may be dependent on input data sets being in a particular format with expected field entries. Output from the data use processor 116 is passed to the data output processor 118. The data output processor 118 may be configured to construct one or more output data sets each having a predetermined format configured for use by other data production systems 110. The data output processor 118 may be configured to transmit output data to one or more particular data production systems 110 known to require the output data and/or to otherwise make the output data available to other systems 110 by storing it in a data storage unit 150. The data output processor 118 may be further configured to transmit a notification of the transmission of any output data to another production system 110 and/or storage of output data in the data storage unit 150.

The data production system 110-*n* may also have an error monitor 117 in communication with one or more of the data input processor 114, the data use processor 116, and the data output processor 118. The error monitor 117 may be configured to act as a "listener" that is continuously monitoring to assure input and output data are as expected and that data structures are in the expected format. The error monitor 117 may be configured to identify data or format mismatches and other processing errors that occur at the data production system 110-*n* and to transmit a notification of any error to the monitoring server 120. The error notification may identify the errant data set, the using data production system 110-*n*, and the source production system 110 from which the errant data set was received. In some embodiments, the error notification may identify data production systems to which the output data has been transmitted or to which the output data was intended to be transmitted.

It will be understood that the organization level system 100 may comprise any number of data production systems 110. It will further be understood that any particular data production system 110-*n* may receive input data from a first set of one or more other data production systems 110. Each data production system 110 in this first set may be referred to as an upstream or source system relative to the user data production system 110-*n*. The user data production system 110-*n* may process the input data to produce output data or, in some cases, may merely pass the input data through as output data. The user data production system 110-*n* may then pass the output data to or otherwise make the output data available to a second set of one or more data production systems 110, which may be referred to as a downstream system relative to the user data production system 110-*n*. The upstream systems 110 and the downstream systems 110 may be the same set, different sets, or overlapping sets.

Figure 3:
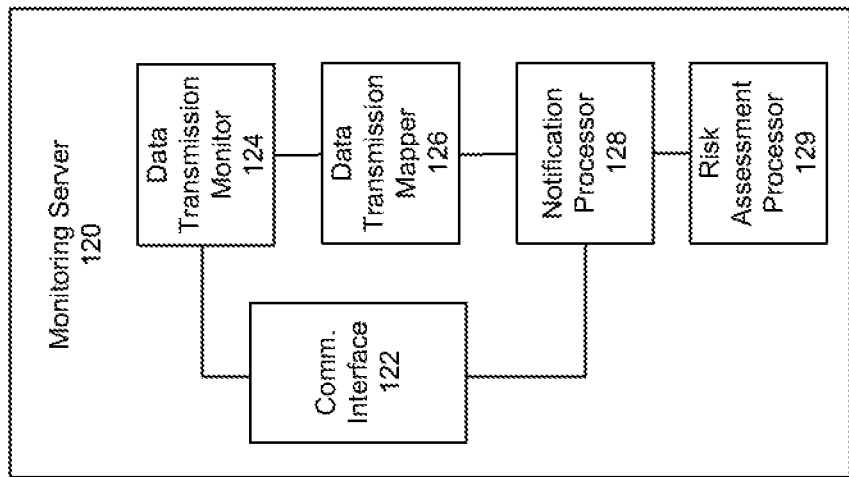
FIG. 3 is a schematic representation of a monitoring server according to an embodiment of the invention.

With reference to FIG. 3, the monitoring server 120 is generally configured for obtaining data traffic information from the data production systems 110 to allow the mapping of data flow throughout the organization level system 100. The monitoring server 120 may also be configured to receive data error information and disseminate to affected or potentially affected production systems 110.

The monitoring server 120 may be a network enabled computer system having a communication interface 122, a data transmission monitor 124, a data transmission mapper 126, and a notification processor 128. The communication interface 122 is configured to establish and support wired or wireless data communication capability for connecting the monitoring server 120 to the network 130 and/or another communication network. The data transmission monitor 124 may be configured to monitor all data transmissions between data production systems 110 and between the production systems 110 and the data storage 150. This may include direct monitoring of all data transmissions or may be based on transmission notifications received from the data production systems 110-*n*. The data transmission mapper 126 may be configured to identify, for each data transfer, a source processor, a receiving processor, and the data transferred. This information may be used to periodically or continuously update a mapping of all data transfers, which may be stored in a mapping database 140.

The notification processor 128 is configured for communication with each data production system 110. The notification processor 128 may, in particular, be configured for receiving error notifications from the error monitors 117 of the production systems 110. The notification processor 128 may also be configured to receive notifications from users that identify data errors in particular data production systems.

The notification processor 128 may be further configured to evaluate the identified error, determine the potentially affected production systems 110, and transmit a data error notification to the potentially affected systems 110. To accomplish these actions, the notification processor 128 may be configured to obtain data transmission information from the data transmission mapper 126 or directly from the mapping database 140. Using this information, the notification processor 128 may identify the original source of the errant data and all data production systems 110 that have received the errant data and/or data derived from the errant data. Notably, this may include production systems 110 both upstream and downstream of the error reporting system 110 and may also include production systems 110 in a parallel data stream not including the reporting system 110. The notification processor may then construct a notification indicating the nature of the data error and its source and transmit it to all data production systems 110 that have received the errant data.

In some cases, data errors identified within the system 100 may not actually have a significant impact on usage of the errant data set. In other cases, the potential impact may be greater for some production systems 110 than others. Accordingly, in some embodiments, the monitoring server 120 may also include a risk assessment processor 129 in communication with the notification processor. The risk assessment processor 129 may be configured to receive from the notification processor 128 information on the data error and the source and recipients of the data error. The risk assessment processor 129 may then determine from a level of risk associated with the data error. This risk level may be communicated to the notification processor 128 for inclusion in the data error notification. In some embodiments, the risk assessment processor 129 may be configured to use information from the notification processor 128 to determine whether the data error even meets predetermined risk criteria that require notification of the recipient systems. In such embodiments, transmission of the data error notification may be conditioned on a determination by the risk assessment processor 129 that the risk criteria have been met.

Figure 4:
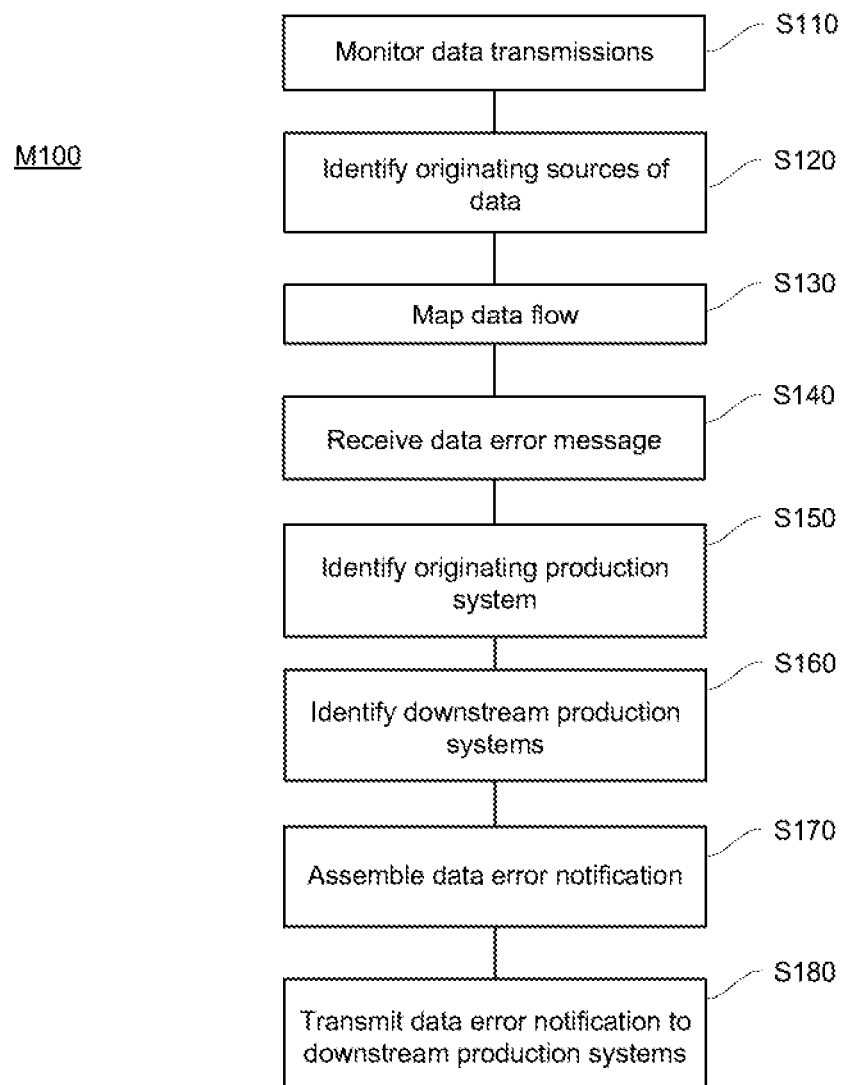
FIG. 4 is a block diagram of actions in a method of mitigating error propagation risk according to an embodiment of the invention.

FIG. 4 illustrates a method M100 of identifying and mitigating risks associated with data error propagation risk in an organization level system of interconnected data production systems such as the systems 110 of FIG. 1. In the method M100, data transmissions between the data production systems are monitored at S110. This may include obtaining information on each transfer of data between two production systems and/or between a production system and a data storage unit. Transfer information may obtained by a monitoring server by direct monitoring of transmissions and/or by receiving, from individual production systems, information on data transfers to or from such production systems. The transfer information may include identification of the source production system and the recipient production system. It may also include information on the data transferred. Such information may include a relationship of the data to data previously received by the source production system. This may be or include, for example, information on how a previously received data set was modified or processed to produce the data being transferred. The data production system making such modifications may be identified as the originating source of the modified data.

At S120, the monitoring server may use the transfer information from monitored transmissions to determine the originating source or sources of a particular set of transferred data. At S130, the monitoring server may map the flow of the data set from the originating source or sources so that all operating systems downstream of the originating source can be identified. This may include operating systems receiving the original data set as well as systems receiving modified versions of the data set or other data affected by the use of the data set. The action of mapping data flow may be carried out periodically or on a continuous basis as data transfers occur. In some embodiments, the action of mapping the data flow may be carried out on an as-needed basis. For example, information on all data transmissions may be stored until a data error is identified. At that point, the stored data transfer information could be retrieved and used to map the flow of one or more particular sets of data.

At S140, the monitoring server receives an indication that a data error has occurred at or upstream of a particular data production system. This indication may be received from a listener or other data processor in the particular data production system. The indication may be included in an error message that identifies the data production system where the data error was identified and indicates the nature of the error. As used herein, the term "data error" includes, but is not limited to any form of unexpected input that may result in the using production system experiencing a system fault or crash, ingesting fewer records than expected, or producing faulty, incomplete or delayed output. Typical data errors could include a field mismatch or other formatting error. Such errors can result, for example, from an upstream data source making changes to a data structure without informing downstream using systems. The resulting mismatch may cause the parser of a downstream system incorrectly parse the data fields. Another potential data error may be found in instances where a parser uses a machine learning model developed based on a certain distribution and receives a different distribution.

In some cases, a data error may be identified by a user (or operating system) of the data production system in which the data error occurred. The monitoring server may then receive a data error message from that user (or operating system) rather than from a using production system. In such cases, it may be more likely that the data error is in the content of the data rather than in its format. For example, a user may determine that numerical errors were made when data was entered into the system. The user may transmit a data error message to the monitoring server to make sure that users of the errant data are warned of the numerical errors.

Upon receiving indication of a data error, the monitoring server, at S150, uses the mapped data flow information to identify the data production system that originated the errant data set. At S160, the monitoring server identifies the data production systems downstream of the originating production system with respect to the flow of the errant data set. At S170, the monitoring server assembles a data error notification for transmission to affected and/or potentially affected downstream production systems. This notification may identify the data set and the nature of the data error.

At S180, the monitoring server transmits the data error notification to some or all of the downstream production systems. In some embodiments, the monitoring server may use error notification criteria to determine which, if any, downstream systems should be notified. Error notification criteria could include, for example, limitations based on the type of production system or the particular software being used by a production system. In particular embodiments, the notification criteria may be based on commonality of the downstream production systems with the originating source production system. For example, the criteria may specify that only downstream systems having the same operating system or that use the same software tool(s) as the originating system be notified. In such embodiments, the method M100 may include determining one or more operating characteristics of the originating source system and comparing them to operating characteristics of the downstream systems.

In some embodiments, the error notification criteria may be or include criteria related to the potential risk associated with the data error. Such criteria may be directly related to the content of the errant data set or may be related to the type of error. In some cases, it may be related to the number of systems using or likely to use the errant data set. In some embodiments, the monitoring server may determine a qualitative or quantitative risk value for the data error and compare it to predetermined risk threshold levels. Such risk threshold levels may vary for different data production systems.

In a variation of the method M100, certain error notifications may be transmitted to data production systems that are not necessarily in the flow stream for the data in which an error is identified. In this variation, the monitoring server may determine one or more operating characteristics of the originating server and then identify all data production systems having a particular operating characteristic (e.g., a particular software tool) in common with the originating server. The monitoring server may then transmit a data error notification to each data production system having that operating characteristic. Such error notifications may be transmitted instead of or in addition to the transmission of error notifications to downstream production systems.

The systems and methods of the invention assure that the risk associated with a data error in an originating data production system can be mitigated by alerting downstream production systems to the error. Particular embodiments enhance efficiency by reducing the number of systems notified through the use of criteria such as commonality with the originating system and/or the relative risk to systems having certain characteristics. These aspects of the invention provide a significant technical improvement in the avoidance of error propagation in interconnected data production systems It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A data production error notification system comprising:
a plurality of data production systems, each data production system having a data processor configured to
receive input data from any other of the plurality of data production systems,
process the received input data to produce output data,
make the output data accessible to any other of the plurality of data production systems, and
responsive to identification of a data error in the production of the output data, generate data error information; and a monitoring server in communication with each of the plurality of data production systems, the monitoring server being configured to
monitor data transmissions between the data production systems,
map data flow from each data production system to identify all downstream data production systems receiving transmitted data from each data production system or data derived from such transmitted data, and
upon identification of a data error in a data transmission originating data production system,
obtain data error information,
assemble a data error notification including an identification of the originating data production system and the data error information, and
transmit the data error notification to those of the plurality of data production systems that meet system notification criteria.

2. A system according to claim 1, wherein the system notification criteria specifies notification of all data production systems downstream of the originating data production system.

3. A system according to claim 1, wherein
the monitoring server is further configured to determine, for each data transmission, one or more operating characteristics of an originating source system associated with the transmitted data.

4. A system according to claim 3, wherein the one or more operating characteristics is a software tool.

5. A system according to claim 3, wherein the system notification criteria specifies notification of each of the plurality of data production systems having one of the one or more operating characteristics in common with the originating data production system.

6. A system according to claim 1, wherein
each data production system has an error monitor configured to
identify a format of the output data,
determine whether the output data format matches an expected format, and
responsive to a determination that the output data format does not match the expected format, notify the monitoring server that a data error in the production of the output data has been identified.

7. A system according to claim 1,
wherein the monitoring server is further configured to determine, based at least in part on the data error information, a risk level associated with the data error, and
wherein the risk level is included in the data error notification.

8. A system according to claim 1,
wherein the data processor of each data production system is further configured to, upon receiving a data error notification from the monitoring server, determine whether input data received from the originating data production system should be processed, and
wherein the actions to process the received input data from the originating data production system and to make the output data accessible are carried out only upon a positive determination that the input data should be processed.

9. A system according to claim 8,
wherein the monitoring server is further configured to determine, based at least in part on the data error information, a risk level associated with the data error,
wherein the risk level is included in the data error notification, and
wherein the action of the data processor to determine whether the input data from the originating data production system should be processed is carried out using the risk level.

10. A method of mitigating error propagation risk in a plurality of interconnected data production systems, the method comprising:
monitoring, by a monitoring server in communication with the plurality of data production systems, a plurality of data transmissions between the data production systems, each data transmission being from a transmitting system to a receiving system,
mapping, by the monitoring server, data flow between the data production systems,
receiving, by the monitoring server, an error message indicating that a data error has occurred in an originating source system, the error message including data error information,
assembling, by the monitoring server, a data error notification including an identification of the originating source system and the data error information, and
transmitting, by the monitoring server, the data error notification to those of the plurality of data production systems that meet system notification criteria.

11. A method according to claim 10, wherein the system notification criteria specifies notification of the data production systems that have received transmitted data from that originating source system.

12. A method according to claim 10, further comprising:
determining, by the monitoring server, for each data transmission, one or more operating characteristics of the originating source system.

13. A method according to claim 12, wherein the system notification criteria specifies notification of each of the plurality of data production systems having one of the one or more operating characteristics in common with the originating source system.

14. A method according to claim 13, wherein the one of the one or more operating characteristics is a software tool.

15. A method according to claim 10, wherein the error message is received from an error monitor in the originating source system.

16. A method according to claim 10, wherein the error message is received from an error monitor in a receiving processing system downstream of the originating source system.

17. A method according to claim 10, further comprising:
determining, by the monitoring server, based at least in part on the data error information, a risk level associated with the data error,
wherein the risk level is included in the data error notification.

18. A data production monitoring server comprising:
a communication interface in communication with each of a plurality of data production systems, the communication interface being configured for receiving data transmission information for each data transmission between data production systems;
a mapping processor configured to identify, for each data production system originating a data transmission, all data production systems that have received transmitted data generated by that originating data production system, and a notification processor configured to, upon identification of a data error in the originating data production system,
  obtain data error information,
  assemble a data error notification including an identification of the originating data production system and the data error information, and
  transmit, via the communication interface, the data error notification to data production systems that meet system notification criteria.

19. A data production monitoring server according to claim 18, wherein the system notification criteria specifies notification of at least one of the set consisting of all data production systems that have received transmitted data generated by the originating data production system and all data production systems having a predetermined operating characteristic in common with the originating source system.

20. A data production monitoring server according to claim 18, further comprising:
  a risk assessment processor configured to determine, based at least in part on the data error information, a risk level associated with the data error, and
  transmit the risk level to the notification processor for inclusion in the data error notification.

* * * * *